United States Patent

Matt et al.

[11] 3,906,105
[45] Sept. 16, 1975

[54] CYANOETHYL AND HALOETHYL DIAMINES AS BACTERICIDES AND FUNGICIDES

[75] Inventors: Joseph Matt, Chicago; Manuel Slovinsky, Woodridge, both of Ill.

[73] Assignee: Nalco Chemical Company, Oak Brook, Ill.

[22] Filed: June 10, 1974

[21] Appl. No.: 477,732

[52] U.S. Cl. .................................. 424/304; 424/325
[51] Int. Cl.² ... A01N 9/06; A01N 9/20; A01N 9/24
[58] Field of Search ............. 424/304, 325; 260/464, 260/563

[56] References Cited
UNITED STATES PATENTS

| | | | |
|---|---|---|---|
| 2,277,158 | 3/1942 | Sexton | 424/304 |
| 3,104,199 | 9/1963 | Langdon et al. | 424/304 |
| 3,139,376 | 6/1964 | Gilbert | 424/325 |
| 3,519,687 | 7/1970 | Schreider et al. | 260/563 R |
| 3,755,597 | 8/1973 | Abramitis | 424/325 |

*Primary Examiner*—Albert T. Meyers
*Assistant Examiner*—D. W. Robinson
*Attorney, Agent, or Firm*—John G. Premo; John S. Roberts

[57] ABSTRACT

Microbicidal cyanoethyl and haloethyl diamine treating agents effective against bacteria such as A. aerogenes and fungi such as A. niger, utilizable in an aqueous or organic carrier in solution or suspension. These substituted amines show inhibition of microbial growth at 0.1 to 25 ppm and are derivatives of cocodiamine (Duomeen C) and related aminopropyl long-chain amines. More particularly, the preferred compounds may be described as mono and bis (2-cyanoethylated) long-chain diamines and corresponding (2-haloethylated) long-chain diamines where halo is chloro, bromo, or iodo. These diamines of the general type

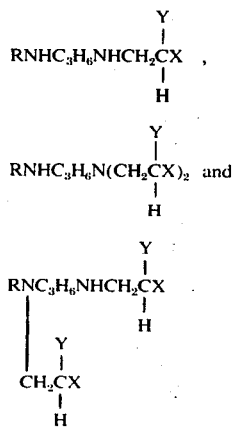

where
  X is uniformly halo or CN;
  Y is H, $CH_3$;
  R is an alkyl radical (straight or branched, saturated or unsaturated) where the length of the carbon chain is from $C_8$–$C_{18}$;
are obtained from acrylonitrile treatment of $RNHC_3H_6NH_2$ and are active microbicides, especially valuable at pH 7 or above.

9 Claims, No Drawings

CYANOETHYL AND HALOETHYL DIAMINES AS BACTERICIDES AND FUNGICIDES

The present invention relates to certain mono and bis (2-cyanoethylated) or (2-haloethylated) long-chain diamines. The cyano products are obtained from the action of acrylonitrile or methacrylonitrile on the basic long-chain amines. The long-chain amine starting materials are well known diamines and the foremost members are described in the *Encyclopedia of Chemical Technology* II, Volume 2, Wiley (1963), page 135, and are exemplified by the following:

| | |
|---|---|
| N-octadecenyltrimethylene-diamine | Duomeen O (Armak) |
| N-coco trimethylene-diamine | Duomeen CD (Armak) |
| N-tallow trimethylene-diamine | Duomeen T (Armak) |
| N-(octadecenyl-octadecadienyl)trimethylene-diamine | Duomeen S (Armak) |

An alternative way of describing the preferred starting material diamines is by terming them N-alkyl trimethylene diamines having the structure

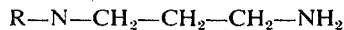

$$R-N-CH_2-CH_2-CH_2-NH_2$$

wherein R is an aliphatic hydrocarbon radical having from 8 to 18 carbon atoms.

The products of the present process resulting from the action of acrylonitrile or methacrylonitrile attacking a nitrogen site on the above diamines may be represented by the following structural formulae:

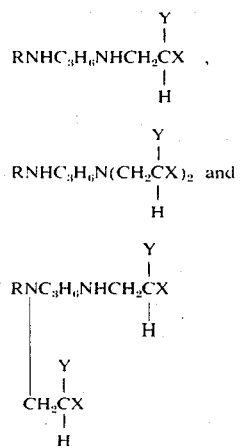

where
X is uniformly CN;
Y is H, CH$_3$;
R is an alkyl radical where the length of the carbon chain is from C$_8$–C$_{18}$. A preferred R defines a hydrocarbon chain derived from coconut oil, tallow, or oleic fatty acids.

In the case of the haloethyl compounds, the products produced are similar to the cyanoethyl products and differ only in the above formula where X is uniformly halo. The halo products may be produced from the reaction of ethylene dichloride and one of the basic long-chain amines noted above and thus are a variation of haloethylation rather than cyanoethylation. Of the halogen substituents, the chloro is preferred for efficacy as well as cost, although iodo and bromo are operable in the process. Where used herein, the term "halo" is defined and construed to include chloro, bromo, and iodo of the available halogens.

Preferred cyanoethylated compounds are N-(2-cyanoethyl) cocodiamine, N,N-bis-(2-cyanoethyl) cocodiamine, and N,N'-bis-(2-cyanoethyl) cocodiamine, and in the haloethyl series equivalent compounds where chloro is substituted for the cyanoethyl group. Other preferred active compounds are made utilizing as starting material Duomeen O, Duomeen T, and Duomeen S.

PRIOR ART

U.S. Pat. No. 3,755,597 Abramitis (Akzona) — Method of killing mosquito larvae where the active agent is a cyanoethylated mono amine such as N-(2-cyanoethyl) dodecylamine.

THE GENERALIZED PROCESS--CYANOETHYLATION

The cyano groups are introduced into the amine by the action of acrylonitrile CH$_2$=CHCN or methacrylonitrile CH$_2$=CCH$_3$CN and the reaction produces compounds which are β-substituted propionitrile derivatives. The propionitrile group residue —CH$_2$CH$_2$CN is termed the β-cyanoethyl or (2-cyanoethyl) group and the present reaction is known as cyanoethylation.

As applied to amines where the cyanoethylation is on the nitrogen, it has been found that the primary amine reacts faster than the secondary amine. Where the primary amine is the target of cyanoethylation, the present reaction proceeds under moderate conditions and utilizing equimolar quantities of reactants without catalysts.

Where the secondary amine is attacked and two cyanoethyl groups are introduced into the amine molecule, super molar quantities of acrylonitrile must be utilized, together with more severe steps to drive the reaction to the right and to attack secondary nitrogen. A summary of available procedures to increase yields is set out in the section on "Cyanoethylation" by N. Bikales, *Encyclopedia of Polymer Science and Technology*, Volume 4, Wiley (1966), pages 539–540; and by the same author in the *Encyclopedia of Chemical Technology* II, Volume 6, Wiley (1963) page 635, especially for catalysts. The subject matter of these two citations is incorporated by reference as representing art-recognized procedures.

Members of the present series of compounds have been found to have cidal activity against bacteria and fungi as well as inhibition against the same microorganisms and specially against A. aerogenes and A. niger. The multi-day inhibition showed activity from 0.1 ppm by weight where the biocidal agent was utilized in aqueous or organic carrier. The range of concentration of the substituted diamine may be from about 0.1–500 ppm where the upper limit is not critical and the diluent may be aqueous or organic.

It is noted that optimum results in using this series of compounds are achieved by utilizing an alkaline pH or a pH greater than 7.0. It has been further found that the microbicide efficacy is best where the pH is between 8 and 10 and with many of the compounds an optimum pH range is about 8.5. Depending on the basicity of the individual substituted amine, necessary pH adjustments may be made conveniently by the addition of an alkalinizing agent such as an alkali metal hydroxide; e.g., sodium or potassium hydroxide.

Additionally, the products of the present invention by analogy with closely related structures have utility as surfactants, epoxy-resin curing agents, petroleum additives, and emulsion breakers.

EXAMPLE 1

Preparation of N-(2-Cyanoethyl) Cocodiamine

To 137½ g (.5 mole) of cocodiamine was added 26.5 g (.5 mole) of acrylonitrile dropwise over an hour at a temperature that rose up to 50°C. The exothermic reaction was controlled by utilization of cold water on the outside of the reaction vessel together with a reflux condenser. After the addition of acrylonitrile was complete, heating was continued for ½ hour at 70°C. The product was liquid and exhibited an index of refraction of 1.4618. The IR study showed the loss of a primary amino group and formation of a secondary amino group.

The above preparation was repeated on a pilot plant scale and identical IR data were obtained. The index of refraction was 1.4625.

EXAMPLE 2

The procedure of Example 1 was followed but Duomeen O, N-octadecenyltrimethylene diamine, was substituted for cocodiamine (coco Duomeen).

67.6 g (.2 mole) of Duomeen O, which is the unsaturated amine from oleic fat, was treated with 10.6 g (.2 mole) of acrylonitrile and a semi-solid was obtained on cooling.

EXAMPLE 3

75 g (.75 mole) of ethylene dichloride and 69 g (.25 mole) of cocodiamine were mixed with 50 g of water in a 300 ml bomb at 125°C for 8 hours. On removal of the contents and neutralizing with caustic, the organic layer was washed with water and dried and then excess ethylene dichloride was removed in vacuo.

The product as shown by NMR had the structure of chloroethyl on the 1-nitrogen of cocodiamine, which might be alternatively expressed as $N^1$-chloroethyl $N^3$-dodecyl propane diamine.

EXAMPLE 4

Kim Inhibition and Kill Tests

This series of tests utilized Kimax screw cap culture tubes hereinafter referred to as Kim tubes and the Kim tests. The tests were designed to show both inhibition and kill against a selected bacteria and also a selected fungus. The culture medium utilized at pH 8.5 was a broth prepared as follows:

1.84 grams NaOH pellets
5.0 grams $KH_2PO_4$
8 grams Difco yeast extract
1 liter deionized $H_2O$ The above ingredients were dissolved and dispensed in 250 ml, 500 ml and 1 liter heat resistant, screw capped bottles and sterilized at 15 pounds for 15 minutes.

In the bacteria tests, the test organism was Aerobacter aerogenes, ATCC 13048. In the fungus test, the test organism was Aspergillus niger, ATCC 6275.

Bacteria Test

Inhibition Test Method — 48 hours

1. Using a 1 ml serological pipette, an amount of chemical, which when diluted with the broth will give the desired concentration, was introduced.
2. Immediately before starting the test, the broth was inoculated with the test organism (0.4 ml inoculum/200 ml broth).
3. 10 ml of inoculated broth were added to each tube at pH 8.5.
4. The contents of the tubes were well mixed and incubated at 86°F for 48 hours.
5. Utilizing pH 8.5, the inhibiting range was determined by observing the presence or absence of turbidity in the tubes. The highest solution which showed turbidity was a dilution at which there was no inhibition. The lowest dilution showing no turbidity was the concentration at which inhibition occurred.

Kill Tests a. 1-Hour Kill

One hour after addition of inoculated broth to the tubes with the chemical, a loopful from each tube was aseptically transferred into sterile nutrient broth tubes. These latter broth tubes were incubated at 98°F for 24 hours. The turbidity as growth or no growth was read at each concentration level.

b. 24-Hour Kill

In this procedure after addition of the inoculated broth of the tubes with the chemical, a loopful was transferred and the procedure in (a) was followed.

Fungus Test

In the mold inhibition test, materials were utilized as in the bacteria test above, using vials 25 × 95 mm, 8-dram. As a test organism, Aspergillus niger, ATCC 6275, was utilized. The inoculum or test organism was prepared as follows:

Sabouraud Dextrose Agar slants were incubated 5 days at 30°C. The cells were harvested by washing slant with 5 cc sterile DI water and transferred to glass screw cap bottles containing sterile glass beads. The agar slant was rewashed and the spores dispersed by agitation before use and stored in the refrigerator.

Using a 1 ml serological pipette, and without touching the sides of the tube, the selected amount of chemical to be tested was introduced, which, when diluted with the broth, gave the desired concentration.

Immediately before starting the test, the inoculation was achieved by 0.3 ml of fungal culture/200 ml of broth, together with mixing. The inoculated broth was added to the tube and incubated at 30°C for 5 days. The contents of each tube was mixed well.

The test for 1- and 24-hour kills was made by aseptically transferring one loopful from each tube into sterile nutrient broth tubes and incubated at 30°C for 5 days.

The inhibition range was determined by observing fungi within the media and mold overgrowth on the surface of the culture medium. The highest dilution showing the presence of growth was a dilution at which there was no inhibition. The lowest dilution showing no fungal growth was the concentration at which inhibition occurred. The 1- and 24-hour observations were determined in the same manner as the inhibition tests by reading the nutrient broth tubes.

Comments: The data in Table I suggest that against A. aerogenes bacteria, the 48-hour inhibition measurement shows that the present compounds are effective in a range of 2.5 ppm or greater and that against the fungus A. niger a positive showing was made in a 5-day inhibition test down to 0.1 ppm.

The chloro variety tested is effective in the range 1–2.5 ppm, and 5-day inhibitions for both the cyanoethyl and chloroethyl derivatives are satisfactory.

In comparative testing of cocodiamines, it was found that the cyanoethyl cocodiamine from a purer grade, Duomeen CD, gave a better color and at least as good a product. The cyanoethyl derivatives from higher homologs such as Duomeen S (soy) and Duomeen O (oleic) were equivalent to cocodiamine as fungicides but not as satisfactory as bactericides. The microbicidal performance of the oleyl product was superior to that originating from the soya diamine.

TABLE I

| Compound From | pH | Microbicidal Experimental Data Activity in ppm Against | | | | | |
|---|---|---|---|---|---|---|---|
| | | A. Aerogenes | | | A. Niger | | |
| | | 1 hr. Kill | 24 hr. Kill | 48 hr. Inhib. | 1 hr. Kill | 24 hr. Kill | 5 day Inhib. |
| Cocodiamine and Acrylonitrile | 8.5 | >25 | 5–10 | 5–10 | <2.5 | 1–2.5 | 0.1–2.5 |
| Cocodiamine (distilled) Acrylonitrile | 8.5 | >25 | 5–10 | 5–10 | >1 | >1 | 0.1–0.25 |
| Duomeen O and Acrylonitrile | 8.5 | >25 | >25 | 10–25 | >1 | >1 | 0.25–0.5 |
| Duomeen S and Acrylonitrile | 8.5 | >25 | >25 | >25 | >25 | >25 | <1 |
| Cocodiamine + $C_2H_4Cl_2$ | 8.5 | >25 | 2.5–5 | 2.5–5 | >25 | 1–2.5 | 1–2.5 |
| Cocodiamine | 8.5 | | | 1–2 | | | 0.25–0.5 |

We claim:

1. A method of inhibiting the growth of bacteria and fungi by applying to an area infested therewith a bacterial or fungicidal effective amount of at least 0.1 ppm by weight of a mono or bis (2-cyanoethylated) or (2-haloethylated) long-chain diamine selected from at least one member of the group consisting of

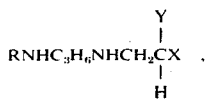

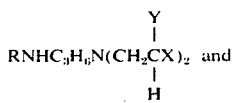

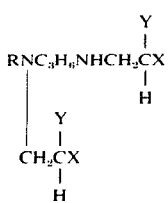

where

X is uniformly halo or CN;
Y is H, or $CH_3$;
R is alkyl where the length of the carbon chain is from $C_8$–$C_{18}$.

2. The method of claim 1 wherein R is the hydrocarbon chain derived from coconut oil.

3. The method of claim 1 wherein R is the hydrocarbon chain derived from tallow.

4. The method of claim 1 wherein R is the hydrocarbon chain derived from oleic fatty acid.

5. The method of claim 1 wherein the long-chain diamine is utilized in a pH greater than 7.0.

6. An aqueous bactericide and fungicide composition having a pH greater than 7.0 and containing a bactericidally or fungicidally effective amount of at least 0.1 ppm by weight of at least one compound selected from the group consisting of

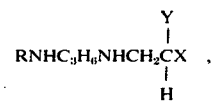

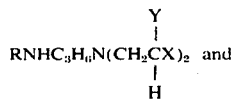

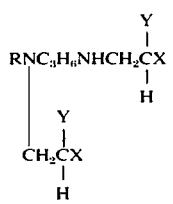

where

X is uniformly halo or CN;
Y is H, $CH_3$;
R is an alkyl radical where the length of the carbon chain is from $C_8$–$C_{18}$.

7. The composition of claim 6 wherein R is the hydrocarbon chain derived from coconut oil.

8. The composition of claim 6 wherein R is the hydrocarbon chain derived from tallow.

9. The composition of claim 6 wherein R is the hydrocarbon chain derived from oleic fatty acid.

* * * * *